(12) United States Patent
Sont et al.

(10) Patent No.: US 8,800,604 B2
(45) Date of Patent: Aug. 12, 2014

(54) HOSE HAVING A LOW PERMEATION RATE, IN PARTICULAR A HOSE FOR A HIGH TEMPERATURE COOLANT, AND METHOD FOR PRODUCING SAME

(71) Applicant: ContiTech Kuehner GmbH & Cie KG, Oppenweiler (DE)

(72) Inventors: Michael Sont, Horneburg (DE); Ute Kehr, Waltershausen (DE)

(73) Assignee: ContiTech Kuehner GmbH & Cie KG, Oppenweiler (DE)

( * ) Notice: Subject to any disclaimer, the term of this patent is extended or adjusted under 35 U.S.C. 154(b) by 0 days.

(21) Appl. No.: 13/740,627

(22) Filed: Jan. 14, 2013

(65) Prior Publication Data

US 2013/0126031 A1 May 23, 2013

Related U.S. Application Data

(63) Continuation of application No. PCT/EP2011/062517, filed on Jul. 21, 2011.

(30) Foreign Application Priority Data

Aug. 30, 2010 (DE) .......................... 10 2010 037 211

(51) Int. Cl.
*F16L 11/00* (2006.01)

(52) U.S. Cl.
USPC ........... 138/129; 138/125; 138/137; 138/140; 428/36.91; 428/36.7

(58) Field of Classification Search
CPC ..... F16L 11/081; F16L 11/085; F16L 11/086; F16L 2011/047; B60H 1/00571

USPC .............. 138/137, 123–126, 140; 428/36.91, 428/36.1, 36.7

See application file for complete search history.

(56) References Cited

U.S. PATENT DOCUMENTS 4,881,576 A * 11/1989 Kitami et al. ................. 138/125
4,905,736 A    3/1990 Kitami et al.

(Continued)

FOREIGN PATENT DOCUMENTS

DE          38 20 447 A1   12/1988
DE        91 02 495.1 U1    5/1991

(Continued)

OTHER PUBLICATIONS

International Search Report dated Sep. 21, 2011 of international application PCT/EP2011/062517 on which this application is based.

*Primary Examiner* — Patrick F Brinson
(74) *Attorney, Agent, or Firm* — Walter Ottesen P.A.

(57) ABSTRACT

A hose having a low permeation rate, in particular a hose for a high temperature coolant, having at least the following layer configuration: a barrier layer in the form of monofilm or multilayer film made of a polymer material; an inner layer that is placed on top of the barrier layer and is made of a polymer material having elastic properties; a reinforcement supported by the inner layer made of threadlike material, and an outer layer made of a polymer material having elastic properties, which protects against external influences. The reinforcement features a spiraled shape, specifically by forming at least two spiraled layers, wherein the area between two spiraled layers is free of an intermediate layer of a polymer material. In addition, the area between two spiraled layers is in particular free of a bonding agent. Further a method for producing such a hose is disclosed.

6 Claims, 2 Drawing Sheets

(56) References Cited

U.S. PATENT DOCUMENTS

| | | | |
|---|---|---|---|
| 4,998,564 A * | 3/1991 | Igarashi et al. | 138/126 |
| 5,084,314 A | 1/1992 | Igarashi et al. | |
| 5,264,262 A * | 11/1993 | Igarashi | 428/36.9 |
| 5,653,475 A | 8/1997 | Scheyhing et al. | |
| 5,826,623 A * | 10/1998 | Akiyoshi et al. | 138/126 |
| 5,957,164 A | 9/1999 | Campbell | |
| 6,376,036 B1 | 4/2002 | Nadkarni et al. | |
| 6,536,479 B2 * | 3/2003 | Wilson et al. | 138/137 |
| 6,774,162 B1 | 8/2004 | Vortkort et al. | |
| 6,941,975 B2 * | 9/2005 | Wilson et al. | 138/141 |
| 7,086,420 B2 | 8/2006 | Kahn et al. | |
| 7,478,654 B2 * | 1/2009 | Haines | 138/137 |
| 7,849,887 B2 * | 12/2010 | Takagi et al. | 138/137 |
| 2004/0040607 A1 * | 3/2004 | Wilson et al. | 138/137 |

FOREIGN PATENT DOCUMENTS

| | | |
|---|---|---|
| DE | 42 32 946 A1 | 4/1993 |
| DE | 196 08 318 A1 | 8/1997 |
| DE | 203 21 380 U1 | 1/2007 |
| EP | 0 222 323 A1 | 5/1987 |
| EP | 0 826 915 A2 | 3/1998 |
| JP | 2006-307987 A | 11/2006 |
| JP | 2007-168104 A | 7/2007 |
| WO | WO 2008/071604 A1 | 6/2008 |

* cited by examiner

HOSE HAVING A LOW PERMEATION RATE, IN PARTICULAR A HOSE FOR A HIGH TEMPERATURE COOLANT, AND METHOD FOR PRODUCING SAME

CROSS REFERENCE TO RELATED APPLICATIONS

This application is a continuation application of international patent application PCT/EP2011/062517, filed Jul. 21, 2011, designating the United States and claiming priority from German application 10 2010 037 211.0, filed Aug. 30, 2010, and the entire content of both applications is incorporated herein by reference.

FIELD OF THE INVENTION

The invention relates to a hose with low permeation rate with at least the following layer structure:
- a barrier layer in the form of a monofilm or multilayer film made of a polymeric material;
- on the barrier layer, an internal layer made of a polymeric material with elastic properties;
- in contact with the internal layer, reinforcement made of a filamental material, and
- an external layer made of a polymeric material with elastic properties which provides protection from exterior effects, for example from abrasion.

BACKGROUND OF THE INVENTION

An important type of hose of the abovementioned type is a coolant hose. Coolant hoses serve to transport gaseous or liquid coolants, in particular fluorocarbon coolants, in air-conditioning systems, and reference is in particular made in this connection to the following literature: DE 38 20 447 A1; U.S. Pat. No. 5,084,314; DE 42 32 946 A1; U.S. Pat. No. 5,653,475; DE 196 08 318 A1; DE 91 02 495 U1; DE 203 21 380 U1; EP 0 222 323 A1; U.S. Pat. No. 4,905,736; EP 0 826 915 A2; U.S. Pat. Nos. 6,376,036; 5,957,154; and, ATZ Automobiltechnische Zeitschrift 98 (1996) 10, page 541.

Films made of a polymeric material are becoming increasingly important, alongside barrier layers based on resin, for example made of phenolic resin. Monofilms are used here, for example made of a polyamide (PA), as also in particular are multilayer films (film-composite materials), for example made of PA and of a polymer based on ethylene-vinyl alcohol (EVOH).

As far as the internal layer is concerned, materials used are mostly elastomers or thermoplastic elastomers. Further details of the relevant materials technology are provided elsewhere.

Embodiments known hitherto which comply with the most recent requirements relating to compatibility with modern refrigeration lubricants, flexibility, noise attenuation, gas impermeability, and dynamic strength have a braiding material as reinforcement.

The braiding method applies a ply of the yarn-based reinforcement. The braiding machine mostly has respectively 12packages rotating toward the right and toward the left. A package can accept up to eight strands, and up to 96 strands are therefore applied to the hose in one direction, and precisely the same number in the other direction. This process provides a hose with 100% yarn covering. Adhesion between the individual plies, internal layer-yarn-external layer, is produced here via an adhesion promoter, these being present in the polymer mixtures, or via adhesion-promoter solutions applied additionally. This design provides a burst in pressure three times as high as demanded by the standard.

There are also coolant hoses with reinforcement which is not applied by braiding. However, these exhibit reduced pressure resistance and they usually have an intermediate layer made of a polymeric material between the plies of the reinforcement.

SUMMARY OF THE INVENTION

An object underlining the invention is then to provide a hose of this generic type which features a particularly low permeation rate for fluorocarbon coolants, high flexibility, a high level of vibration damping, good dynamic properties, and high dynamic pressure resistance.

The object is achieved in that the reinforcement is helical, and specifically forms at least two helical plies, where the region between two helical plies is free from any intermediate layer made of any polymeric material.

Possible designs used in respect of the reinforcement are in particular the following:
- The reinforcement takes the form of a plurality of helices, and at least two helical plies are thus formed. This method produces a reinforcement structure with high strand density with simultaneous presence of gaps between strands.
- The region between two helical plies is free from any adhesion promoter.
- The strand material for the reinforcement is composed of a yarn which is in particular composed of a synthetic polymer. A yarn made of polyester or of a polyaramid is of particular importance because of its high strength.

Further details of the barrier layer, and also of the internal layer and external layer, are now given below.

The barrier layer, composed of a thermoplastic or of a thermoplastic elastomer, has a thickness of from 0.05 to 0.6 mm, in particular from 0.3 to 0.4 mm.

In particular, the following two variants are used in connection with a barrier layer in the form of a monofilm:
- The film is composed of a polyamide (PA), in particular of PA6, in particular in turn of a flexibilized PA6.
- The film is a thermoplastic alloy made of PA6 and of a polyolefin, such as polypropylene (PP). The alloy comprises additives, but preferably has low plasticizer content, and in particular is plasticizer-free.

Various film materials are used in the context of a barrier layer in the form of a multilayer film, in particular of a two-layer film: all of the films can be composed of thermoplastic materials, or else can comprise a combination of a thermoplastic with a thermoplastic elastomer. By way of example, in a thermoplastic film composite a first film is composed of the abovementioned PA6 and a second film is composed of a polymer based on ethylene-vinyl alcohol (EVOH).

The polymeric material of the internal layer and external layer of the hose has elastic properties, and two polymer variants in particular used in this connection are the following:

Polymer Variant A

The polymeric material is an elastomeric material based on a vulcanized rubber mixture which comprises an unblended rubber component or a rubber-component blend and conventional mixture ingredients. Particular rubber components that may be mentioned are:
ethylene-propylene copolymer (EPM)
ethylene-propylene-diene copolymer (EPDM)
nitrile rubber (NBR)

(partially)hydrogenated nitrile rubber (HNBR)
fluoro rubber (FKM)
chloroprene rubber (CR)
natural rubber (NR)
styrene-butadiene rubber (SBR)
isoprene rubber (IR)
butyl rubber (IIR)
bromobutyl rubber (BIIR)
chlorobutyl rubber (CIIR)
brominated copolymer made of isobutylene and para-methylstyrene (BIMS)
butadiene rubber (BR)
chlorinated polyethylene (CM)
chlorosulfonated polyethylene (CSM)
polyepichlorohydrin (ECO)
terpolymers of ECO with ethylene oxide and with unsaturated monomers (ETER)
ethylene-vinyl acetate rubber (EVA)
acrylate rubber (ACM)
ethylene-acrylate rubber (AEM)
silicone rubber (MQ, VMQ, PVMQ, FVMQ; WO 2008/071604 A1)
fluorinated methylsilicone rubber (MFQ)
perfluorinated propylene rubber (FFPM)
perfluorocarbon rubber (FFKM).

It is also possible to use a blend, in particular in conjunction with one of the abovementioned types of rubber, for example an NR/BR blend.

The preferred rubber components for the internal layer are: EPDM, IIR, BIIR, CIIR, or BIMS, or blends thereof, or blends with other types of rubber. Unblended BIMS is of particular importance here.

The preferred rubber components for the external layer are: ACM, AEM, CM, ETER, EPDM, EPM, EVA, IIR, BIIR, CIIR, BIMS, FKM, or HNBR, or blends thereof, or blends with other types of rubber. Unblended EPDM or EPM is of particular importance here.

The conventional mixture ingredients comprise at least one crosslinking agent or one crosslinking agent system (crosslinking agent and accelerator). Other mixture ingredients are mostly also a filler and/or a processing aid, and/or a plasticizer, and/or an antioxidant, and/or an adhesion promoter, and also optionally other added materials (for example, color pigments). In this connection, reference is made to the general prior art of rubber mixture technology.

Polymer Variant B

The polymeric material is a thermoplastic vulcanizate (thermoplastic elastomer, abbreviated to TPE), comprising at least one thermoplastic component, at least one rubber component, which has been at least partially crosslinked, and also conventional mixture ingredients.

The preferred thermoplastic components are:
polyolefin, in particular polyethylene (PE) or polypropylene (PP)
polystyrene
polyamide (PA), such as PA6 or PA6.6
polyester, such as PET, PEN, or PBT.

Particular rubber components that may be mentioned are EPM, EPDM, SBR, CR, NR, NBR, FKM, ACM, or AEM, where these in particular have not been blended with any other rubber component.

In relation to the conventional mixture ingredients, reference is made to the mixture technology relating to polymer variant A, in particular to the teaching in U.S. Pat. No. 6,774,162.

Polymer variant B is in particular used for the internal layer.

Mixture examples are given below for the internal layer (Table 1) and the external layer (Table 2).

TABLE 1

| Mixture constituent | Range of amounts [% by wt.] | Information |
|---|---|---|
| Rubber component | from 30 to 60 | a) |
| Filler | from 10 to 35 | b) |
| Fatty acid | from 0 to 2 | |
| Metal oxide | from 0 to 20 | c) |
| Plasticizer | from 0 to 15 | d) |
| Processing aid | from 0 to 3 | |
| Antioxidant | from 0 to 5 | e) |
| Coagent | from 0.1 to 5 | f) |
| Crosslinking agent | from 0.8 to 8 | g) | a) EPDM, IIR, BIIR, CIIR, or BIMS, in particular unblended BIMS, or blends thereof, or blends with other types of rubber,
b) FEF, GPF, HAF, SRF, or MT carbon blacks, silicas, chalk, kaolin, aluminum silicates, calcium silicates, magnesium silicates, and other fillers known to the person skilled in the art, or combinations thereof, in particular a combination of FEF carbon black and lamellar magnesium silicate
c) CaO, MgO, ZnO, and other metal oxides known to the person skilled in the art, and combinations thereof, in particular ZnO
d) mineral oil plasticizers, polymer plasticizers, ester plasticizers, and other plasticizers known to the person skilled in the art, or combinations thereof, in particular a paraffinic mineral oil plasticizer
e) any of the antioxidants known to the person skilled in the art, or combinations thereof
f) acrylates and cyanurates known to the person skilled in the art, or combinations thereof, in particular triallyl cyanurate (TAC)
g) the following, known to the person skilled in the art: peroxides, alkylphenol-formaldehyde resins (APFR), brominated alkylphenol-formaldehyde resins (BAPFR), or other crosslinking systems known to the person skilled in the art for IIR, or combinations thereof, in particular APFR.

TABLE 2

| Mixture constituent | Range of amounts [% by wt.] | Information |
|---|---|---|
| Rubber component | from 20 to 65 | h) |
| Filler | from 15 to 50 | i) |
| Fatty acid | from 0 to 2 | |
| Metal oxide | from 0 to 20 | j) |
| Plasticizer | from 0 to 25 | k) |
| Processing aid | from 0 to 3 | |
| Antioxidant | from 0 to 5 | l) |
| Coagent | from 0.1 to 5 | m) |
| Crosslinking agent | from 0.3 to 8 | n) | h) ACM, AEM, CM, ETER, EPDM, EPM, EVA, IIR, BIIR, CIIR, BIMS, FKM, or HNBR, in particular unblended EPDM or EPM, or blends thereof, or blends with other types of rubber
i) FEF, GPF, HAF, SRF, or MT carbon blacks, silicas, chalk, kaolin, aluminum silicates, calcium silicates, magnesium silicates, and other fillers known to the person skilled in the art, or combinations thereof, in particular FEF, GPF, and MT carbon blacks, or combinations thereof
j) CaO, MgO, ZnO, and other metal oxides known to the person skilled in the art, and combinations thereof; for EPM in particular ZnO and MgO; for ACM and AEM in particular no metal oxides
k) mineral oil plasticizers, polymer plasticizers, ester plasticizers, and other plasticizers known to the person skilled in the art, or combinations thereof; for EPM in particular a paraffinic mineral oil plasticizer; for ACM and AEM in particular no plasticizer,
l) any of the antioxidants known to the person skilled in the art, or combinations thereof
m) allyl compounds known to the person skilled in the art, for example TAC, TAIC, TAP, TATM, DAPE, DATP, TAE, TC, ATC, and others; methacrylates, such as BDMA, EDMA, TEDMA, TRIM, and others; zinc diacrylates, 1,2-BR; N,N'-m-phenylenedimaleimide or combinations thereof, but in particular TAC
n) APFR, BAPFR, or other crosslinking systems known to the person skilled in the art for butyl rubbers, or combinations thereof; peroxides known to the person skilled in the art from the following classes; alkyl aralkyl peroxides, diaralkyl peroxides, peroxyketals, peroxyesters, and others, and also combinations thereof, in particular dicumyl peroxide, bis(tert-butyl-peroxyisopropyl)benzene, and 2,5-bis(tert-butyl-peroxy)-2,5-dimethylhexane.

Within the ranges of amounts given in Tables 1 and 2, the entirety of all of the mixture constituents used is always 100% by weight.

The hose of the invention is preferably used as high-temperature coolant hose. This novel high-temperature coolant hose complies with all of the requirements imposed on coolant hoses by the specifications of the automobile industry. The novel hose is capable of universal use for the suction and pressure side of air-conditioning systems.

By using the novel hose design, it is moreover possible to produce molded hose sections, in particular in turn molded coolant hoses.

Another object of the invention consists in providing a process which can be used to produce a hose which features a particularly low permeation rate for fluorocarbon coolants, high flexibility, a high level of vibration damping, good dynamic properties, and high dynamic strength, and specifically with a process sequence that is not only simplified but also cost-effective.

This object is achieved via at least the following process steps:
 a monofilm or a multilayer film is formed as barrier layer with low permeation rate via extrusion of a polymeric material;
 an internal layer made of a vulcanizable polymer mixture is extruded onto the barrier layer;
 reinforcement is applied to the internal layer by forming a helix of a filamental material, and specifically with formation of at least two helical plies;
 an external layer made of a vulcanizable polymer mixture is extruded onto the reinforcement;
 finally, the unvulcanized hose is vulcanized.

In respect of the thickness of the barrier layer, of the film materials, of the reinforcement material, and also of the vulcanizable polymer mixtures based on elastomer or on TPE for the internal layer and external layer, reference is made to the details given previously.

The process of the invention, with integration of the novel helical method, without any extruded intermediate layer between two helical plies, can give a continuous sequence of the abovementioned process steps, with high line speed.

One embodiment of the novel helical method comprises the following points:
 Two plies of yarn are applied in succession.
 By using specific feedwheel systems (2×24), it is possible to maintain strand tensions of from 0 to 100%, and specifically stepless regulation of these is possible.
 The following advantages are in turn associated therewith:
 Uniform yarn feed by way of the feedwheel systems produces a clean ply pattern on the hose.
 Because stepless regulation of strand tension is possible in both layers independently of one another, it is possible to embed the strands of the first ply to some extent into the internal layer, in such a way that the gaps between the strands are utilized to obtain adhesion to the external layer. It is therefore not necessary to extrude any intermediate layer. The wall thickness of the internal layer is adapted appropriately here.
 The reinforcement is moreover formed in a manner which uses no adhesion promoter between two helical plies, for example by dip coating, spreading, or spraying of a solution or of an aqueous dispersion. The individual strands optionally have an optimized finish which promotes the adhesion of the strands to one another and to the internal and external layer.
 The internal layer is also applied to the barrier layer without any adhesion promoter.
 The vulcanization of the unvulcanized hose is carried out with steam and/or pressure.

In summary, the following advantages are associated with the novel helical process:
 reduction of yarn usage by 50%;
 reduction of total material usage by 18%;
 no requirement to use externally applied adhesion promoters;
 no requirement for any extruded intermediate layer between the helical plies.

BRIEF DESCRIPTION OF THE DRAWING

The invention will now be described with reference to the drawings in which.

DESCRIPTION OF THE PREFERRED EMBODIMENTS OF THE INVENTION

Figure 1:
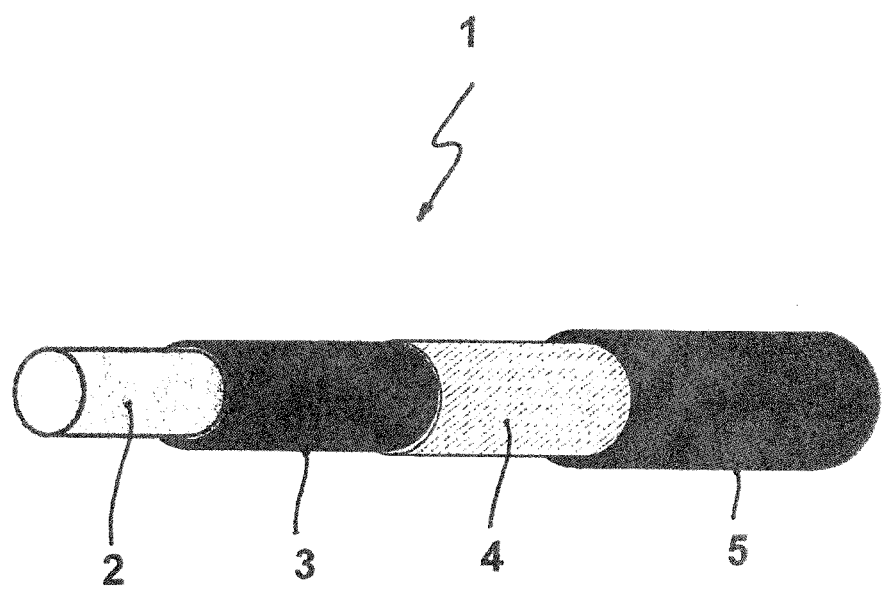
FIG. 1 shows a hose; and,
FIG. 2 shows a cross-section of the hose in FIG. 1.
Figure 2:
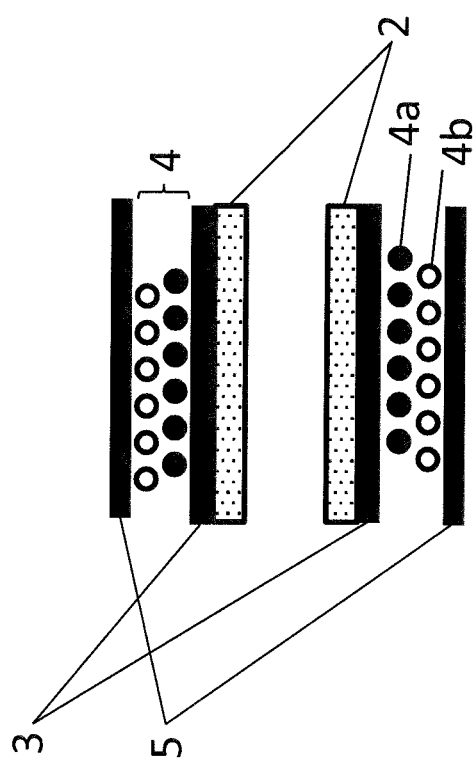

The hose 1 has the following layer structure:
 a barrier layer 2 with low permeation rate in the form of a monofilm made of PA6 or multilayer film made of a coextruded film composite made of PA6/EVOH;
 on the barrier layer 2, an internal layer 3 made of a vulcanized rubber mixture based on unblended BIMS;
 in contact with the internal layer 3, multiple-ply reinforcement 4 made from yarn 4a and yarn 4b which are arranged in helical form, using a yarn made of a polyaramid and with no use of any intermediate layer made of a polymeric material, and also
 on the reinforcement 4, an external layer 5 made of a vulcanized rubber mixture based on unblended EPDM, where the external layer 5 is in contact directly with the reinforcement, without intermediate layer.

It is understood that the foregoing description is that of the preferred embodiments of the invention and that various changes and modifications may be made thereto without departing from the spirit and scope of the invention as defined in the appended claims.

| KEY (part of the description) | |
|---|---|
| 1 | Hose |
| 2 | Barrier layer |
| 3 | Internal layer |
| 4 | Reinforcement |
| 5 | External layer |

What is claimed is:

1. A hose with low permeation rate having a layer structure, the hose comprising:
 a barrier layer in the form of a monofilm or multilayer film made of a polymeric material;
 on the barrier layer, an internal layer made of a polymeric material with elastic properties;
 in contact with the internal layer, reinforcement made of a filamental material; and,
 an external layer made of a polymeric material with elastic properties which provides protection from exterior effects;
 wherein the reinforcement forms at least two helical plies, and wherein the region between the at least two helical plies is free from any intermediate layer made of any polymeric material; and,
 wherein the region between the at least two helical plies is free from any adhesion promoter.

2. The hose as claimed in claim 1, wherein the filamental material for the reinforcement is composed of a yarn.

3. The hose as claimed in claim 2, wherein the yarn is composed of a synthetic polymer.

4. The hose as claimed in claim 3, wherein the yarn is composed of a polyester or of a polyaramid.

5. The hose as claimed in claim 1, wherein the external layer is in contact directly with the reinforcement, without any intermediate layer therebetween.

6. The hose as claimed in claim 1, being a high-temperature coolant hose.

* * * * *

UNITED STATES PATENT AND TRADEMARK OFFICE
CERTIFICATE OF CORRECTION

| | | |
|---|---|---|
| PATENT NO. | : 8,800,604 B2 | Page 1 of 1 |
| APPLICATION NO. | : 13/740627 | |
| DATED | : August 12, 2014 | |
| INVENTOR(S) | : Michael Sont et al. | |

It is certified that error appears in the above-identified patent and that said Letters Patent is hereby corrected as shown below:

In the Specification

In Column 1:
Line 40: delete "5,957,154;" and substitute -- 5,957,164; -- therefor.
Line 60: delete "12packages" and substitute -- 12 packages -- therefor.

In Column 4:
Line 53: delete "classes;" and substitute -- classes: -- therefor.

Signed and Sealed this
Twenty-fifth Day of November, 2014

Michelle K. Lee
*Deputy Director of the United States Patent and Trademark Office*